United States Patent Office 3,107,252
Patented Oct. 15, 1963

3,107,252
ALLANTOIN SALT
Irwin I. Lubowe, Scarsdale, N.Y.
(667 Madison Ave., New York 21, N.Y.)
No Drawing. Filed Dec. 1, 1959, Ser. No. 856,359
8 Claims. (Cl. 260—309.5)

This invention relates to new chemical compounds, and more particularly, provides new chemical compounds comprising salts of sulfur-containing amino acid compounds with allantoin compounds selected from the class consisting of allantoin and aluminum salts of allantoin.

Sulfur-containing amino acids and particularly methionine, ($CH_3$—S—$CH_2$—$CH_2$—CH($NH_2$)—COOH), used either as such or in the form of derivatives which can be metabolized, such as the N-acetyl derivative, promote the formation and repair of cells and tissues. Sulfur metabolism is known to be involved in the formation and regeneration of animal (including human) cells and tissues. The sulfur-containing amino acid compound, by releasing active organic sulfur, can thus aid in the repair and regeneration of tissue undergoing devitalization and reduction of normal keratinization. Also, as an essential amino acid, methionine is one of the building blocks of tissue formation. Clinicians in the field of protein and amino acid metabolism have characterized the essential qualities of methionine as follows: It aids nitrogen retention, diminishes nitrogen excretion, and maintains nitrogen balance; it has lipotropic activity; it maintains water balance; it participates in sulfur metabolism; it has transmethylating activity; it aids in detoxification; it participates in antibody formation; and it may have an antidicoumarol effect. It is doubtful if there is any other material with such unusual diversity of medical applications as methionine, the variety of properties of which are so important in understanding the pharmacodynamic disturbances of lipid, protein, sulfur, and water metabolism. Additionally, methionine has been observed to act as a nutritional stimulant. Used in conjunction with low level antibiotics in farm animal feeds, in many instances it produces increased weight and improved feed conversion. It has a favorable effect upon the feathers of birds and the pelts of fur-bearing animals.

Allantoin is a nitrogen-containing compound of the formula

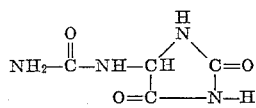

This compound stimulates cell proliferation and tissue growth. Its healing properties are assisted by the fact that it is mildly keratolytic and a protein dispersant: it debrides necrotic and scaly tissue. Moreover, it has been suggested that allantoin has a soothing, pain-relieving action. Certain complex aluminum salts of allantoin have been found to possess the soothing and healing properties of allantoin and the astringent properties of aluminum compounds. These salts are particularly valuable in that they possess this combination of properties, without, however, possessing the usual skin irritant characteristics of aluminum salts, or the destructive action of such aluminum salts on fabrics.

While the stated compounds comprising sulfur-containing amino acids, on the one hand, and allantoin and aluminum salts of allantoin, on the other, have severally been used for their beneficial properties, as stated with moderate success, they individually have limiting drawbacks. For example, methionine and its compounds, such as N-acetylmethionine, have a pronounced sulfur odor due to hydrolysis. This is particularly objectionable where it is desired to use a topical application of a sulfur-containing amino acid compound, for dermatological or cosmetic purposes. Allantoin, on the other hand, has limited solubility in water and alcohol. A saturated aqueous solution contains only 0.6% of allantoin. While allantoin has been shown to be effective in the dry state or in a suspension, this limited solubility is sometimes disadvantageous, as, for example, where it is desired to utilize irrigation or a compress to a wound, or topical application.

Simple mixtures of allantoin or its aluminum salts with a sulfur-containing amino acid compound such as N-acetylmethionine do not overcome these disadvantages. The sulfur odor of the sulfur-containing amino acid compound persists, for example. The insolubility of the allantoin compound remains a limitation. Moreover, compatibility limitations are encountered. Mere mixtures of the two materials may result in precipitation of one in certain media.

It is an object of this invention to provide new chemical compounds.

A particular object of the invention is to provide new chemical compounds having therapeutic properties when applied topically for dermatological or cosmetic purposes, or when used internally in pharmaceutical preparations.

A further object is to provide new chemical compounds comprising salts of sulfur-containing amino acid compounds with an allantoin compound selected from the group consisting of allantoin and aluminum salts of allantoin, such salts having water solubility which is substantially greater than that of the stated allantoin compound, while exhibiting the therapeutic activity of both the sulfur-containing amino acid compound and the allantoin compound.

An additional object is to provide novel salts of sulfur-containing amino acid compounds with an allantoin compound selected from the class consisting of allantoin and aluminum salts of allantoin, and particularly salts of methionine and its compounds such as N-acetylmethionine with the stated allantoin compounds, which have the therapeutic properties of the amino acid compound and the allantoin compound without, however, exhibiting the properties which limit the utility of the individual components of the salt.

These and other objects will become evident from a consideration of the following specification and claims.

The novel compounds of the present invention, considered broadly, are salts of a physiologically utilizable sulfur-containing α-amino acid compound with an allantoin compound selected from the class consisting of allantoin and complex aluminum salts of allantoin.

It has been found that a sulfur-containing amino acid compound and allantoin or complex aluminum salts of allantoin can be combined to provide novel compounds which are salts of the amino acid compound with the allantoin compounds, having properties which neither of the components exhibit separately or in simple admixtures of one with the other. The solubility of the presently provided salts is very much greater than would be expected from the comparative solubilities of the components entering into the formation of the salts. This enhanced solubility renders the presently provided compounds more suitable for topical and dermatological applications where water solubility is required, as in the preparation of water solutions for irrigation, application as compresses, or the like. The presently provided salts do not present the compatibility problems of mere mixtures of the two components, where solutions are desired to be used. Physiologically, the components have a synergistic action. On the one hand, the sulfur-containing amino acid compound supplies the sulfur which is essential in cell formation and tissue regeneration. On the other hand, the allantoin compound cooperates with the amino acid compound by stimulating normal cell and tissue formation, and at the same time having a keratolytic action in cleansing away undesirable necrotic or scaly tissue. The novel salts of this invention which contain aluminum also exert the astringent action of aluminum without exhibiting the irritant characteristics of usual aluminum salts. Additionally, it is found that the novel salts provided by this invention do not have the objectionable sulfur odor of the sulfur-containing amino acid compound from which the salts are prepared. Moreover, these salts are more substantative to the skin than the amino acid compound itself, or a mixture thereof with the allantoin compound, thus producing a more prolonged action.

Thus the novel compounds of this invention offer many advantages for use in topical applications for dermatological or cosmetic purposes, or internal use as pharmaceuticals. For example, topical applications may be utilized in the treatment of surface skin disturbances, such as lacerations, abrasions, inflammations, rashes, chapped skin, and dermatological conditions of various kinds, such as varicose ulcer, xeroderma, and pruritic and inflammatory dermatoses, eczematous dermatoses, and various acne states. Compounds of the invention, especially the aluminum compounds, may also be used internally. They may be employed for example, in the treatment of peptic gastric ulcers, where they will exert a desirable healing effect on the ulcerated area. Oral ingestion of the compounds of the invention produces no toxic effect.

The nature of the compounds provided by this invention will be best understood by consideration first of the compounds from which these novel salts are prepared, comprising a physiologically useful sulfur-containing alpha-amino acid compound and an allantoin compound selected from the class consisting of allantoin and complex aluminum salts of allantoin.

The physiologically useful sulfur-containing amino acids are alpha-amino alkyl carboxylic acids in which from 1 to 2 methylene radicals intervene between the amino-substituted alpha carbon atom and a sulfur atom attached to such methylene radicals. In synthesis of such amino acids, the amino group is frequently blocked by acylation thereof. The acyl radical is removed in metabolisis of such amino acids, and accordingly both the free amino acid and the N-acyl amino acid are physiologically useful. The presently useful amino acids may therefore be represented by the formula $$R-S-(CH_2)_n-CH-COOH$$
$$\phantom{R-S-(CH_2)_n-}|$$
$$\phantom{R-S-(CH_2)_n-}R_1-N-H$$

wherein $n$ is an integer of from 1 to 2, $R_1$ is selected from H and an acyl radical, and R—S— represents the terminal, sulfur-bearing group of the acid, as further defined hereinafter.

In the presently preferred embodiment of this invention, R—S— represents a sulfur atom substituted by from 1 to 2 alkyl radicals each containing from 1 to 2 carbon atoms. When the sulfur atom is substituted by 2 alkyl radicals, it will have a residual valence, which will be satisfied by attachment to an anion.

The sulfur-containing amino acid compound most preferred in the practice of this invention is a methionine compound. Methionine, itself, of the formula $$CH_3SCH_2CH_2CH(NH_2)COOH$$

in which the α-amino radical exists as a free amino group, can be used in the practice of this invention. Preferably, however, the amino group will be blocked or protected by acylation. Conveniently the stated acyl group will comprise an acetyl radical. Thus, for example, a particularly useful form of methionine compound for preparation of the novel salts of this invention will comprise N-acetylmethionine. Alternatively, however, the α-amino radical may be acylated by any one of a variety of other acyl groups consisting of a hydrocarbon radical linked to a

radical. Lower aliphatic acyl radicals such as the stated acetyl group or a formyl or propionyl group are preferred. These are usually economical and commercially feasible. Higher aliphatic acyl radicals, particularly fatty acid acyl radicals such as caproyl, capryl, lauroyl, myristoyl, palmitoyl, stearoyl, oleoyl, or the like, may, however, be used. Alternatively, the acyl radical may be aromatic, as exemplified by N-benzoylmethionine, N-p-toluylmethionine, and the like.

A methionine compound as discussed in the above paragraph is a compound of the formula $$CH_3-S-(CH_2)_2-CH-COOH$$
$$\phantom{CH_3-S-(CH_2)_2-}|$$
$$\phantom{CH_3-S-(CH_2)_2-}R_1-NH$$

where $R_1$ is selected from H and an acyl radical. As will be observed, this formula represents compounds of the general formula stated above, in which R—S— is a $CH_3S$— radical and $n$ is 2.

It has been observed that physiological effects like those produced by methionine can be obtained with simple compounds closely related to methionine, including the next adjacent homolog of methionine, of the formula $$CH_3CH_2-S-(CH_2)_2-CH-COOH$$
$$\phantom{CH_3CH_2-S-(CH_2)_2-}|$$
$$\phantom{CH_3CH_2-S-(CH_2)_2-}R_1-NH$$

where $R_1$ is as defined above, and the sulfonium compounds produced by reaction of a methionine compound of the stated nature or the next adjacent homolog of such a methionine compound, having the above-stated formula, with a simple alkyl halide. Such sulfonium compounds have the formula

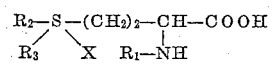

where $R_2$ and $R_3$ are alkyl radicals containing from 1 to 2 carbon atoms, X is an anion, and $R_1$ has the meaning stated above. Usually X will be a simple and cheap inorganic anion such as a halide ion like chloride, bromide or iodide. The use of such simple compounds closely related to methionine, as well as of a methionine compound as discussed above, is also contemplated in connection with this invention. This group of compounds will include, for example, the next adjacent homolog of methionine, which is 2-amino-4-(ethylthio) butyric acid, and its N-acyl derivatives, such as N-formyl-2-amino-4-(ethylthio)butyric acid, N-acetyl-2-amino-4-(ethylthio)butyric acid, N-caproyl-2-amino-4-(ethylthio) butyric acid, N-oleoyl-2-amino-4-(ethylthio)butyric acid, N-benzoyl-2-amino-4-(ethylthio)butyric acid, and the like. It will also include sulfonium compounds such as dimethyl(3-carboxy-3-aminopropyl)sulfonium chloride, dimethyl(N - acetyl - 3 - carboxy - 3 - aminopropyl)sulfonium chloride, diethyl (N-acetyl-3-carboxy-3-aminopropyl)sulfonium bromide, ethylmethyl (N-acetyl-3-carboxy-3-aminopropyl)sulfonium chloride, ethylmethyl(N-formyl-3-carboxy-3-aminopropyl)sulfonium chloride, and so forth.

A further class of sulfur-containing α-amino acids involved in animal and particularly human metabolism comprises cysteine, of the formula $$HS-CH_2-CH(NH_2)COOH$$

and the disulphide into which it may be reversibly converted (by an oxidation-reduction reaction), cystine, of the formula $(S-CH_2-CH(NH_2)COOH)_2$. These are compounds of the above-stated general formula where $n$ is 1 and R—S— is selected from HS— and $$HOOC-CH(NH_2)-CH_2-S-S-$$

Unlike methionine, cystine and cysteine are not "essential" amino acids, which are the amino acids necessary to support growth in young animals. On the other hand, however, the majority of the sulfur-containing proteins contain cystine, so that this compound and the corresponding mercaptan cysteine, into which it may be reversibly converted, are physiologically useful. This invention accordingly contemplates provision of novel salts of cystine and cysteine in addition to those of methionine. These sulfur-containing α-amino acids, like methionine, may be used in the form of the N-acylated compounds, such as N-acetylcysteine, N,N'-diacetylcystine, N-acetyl-N'-formylcystine, N-caproylcysteine, N-benzoylcysteine, and so forth, or in the form of the amino acids containing free amino groups.

As is known, the natural configuration of amino acids in the proteins present in the animal body is the l or levo configuration. However, it is known that some of the essential amino acids can be utilized in either form: d or l configuration of the alpha carbon atom. This indicates that in these cases the animal can convert one optical isomer into its enantiomorph. Since the d,l-racemates will be the most readily available commercial products, they will be preferred for use in connection with the preparation of the products of the present invention. However, if desired, an individual optical isomer of any of these compounds may alternatively be used. It is to be understood that in referring to amino acid compounds herein, it is intended to include individual optical isomers and racemic mixtures.

Turning now to the allantoin compounds used in preparing the salts of this invention, these comprise allantoin and complex aluminum salts of allantoin. The complex aluminum salts of allantoin referred to are the complex salts containing a radical or radicals in addition to the aluminum and allantoin radical which may be prepared as described in Mecca Patent 2,761,867. Illustrative of such salts are: aluminum hydroxy allantoinate, $Al(OH)_2C_4H_5N_4O_3$; aluminum chlorhydroxy allantoinate, $Al_2(OH)_4ClC_4H_5N_4O_3$; aluminum sulfam allantoinate, $Al_2(SO_3NH)_3C_4H_5N_4O_3$; aluminum sulfate allantoinate, $AlSO_4C_4H_5N_4O_3$; aluminum chlor allantoinate, $AlCl_2C_4H_5N_4O_3$; aluminum acetate allantoinate, $Al(CH_3COO)_2C_4H_5N_4O_3$; aluminum ammonium sulfate allantoinate, $AlNH_4SO_4(C_4H_5N_4O_3)_2$; aluminum benzoate allantoinate, $Al(C_7H_5O_2)_2C_4H_5N_4O_3$; aluminum brom allantoinate, $AlBr_2C_4H_5N_4O_3$; aluminum iodo allantoinate, $AlI_2C_4H_5N_4O_3$; aluminum lactate allantoinate, $Al(CH_3CH(OH)COO)_2CH_5N_4O_3$; aluminum phenolsulfonate allantoinate, $Al(C_6H_4OHSO_3)_2C_4H_5N_4O_3$; aluminum potassium sulfate allantoinate, $AlKSO_4(C_4H_5N_4O_3)_2$; aluminum salicylate allantoinate, $$Al(C_6H_4OHCOO)_2C_4H_5N_4O_3$$

aluminum sodium sulfate allantoinate, $$AlNaSO_4(C_4H_5N_4O_3)_2$$

and the like.

The presently preferred aluminum salts are aluminum hydroxy allantoinate, aluminum chlorhydroxy allantoinate, aluminum chlor allantoinate, aluminum sulfate allantoinate, and aluminum sulfam allantoinate, and particularly the first two of those mentioned.

The novel salts provided by this invention comprising salts of the stated sulfur-containing amino acid compounds with allantoin are 1:1 equimolar addition compounds. Those salts of this nature prepared from a methionine compound may be designated allantoin methioninates. They include, for example: allantoin methioninate, allantoin N-formylmethioninate, allantoin N-acetylmethioninate, allantoin N-proprionylmethioninate, allantoin N-butyrylmethioninate, allantoin N-lauroylmethioninate, allantoin N-myristoylmethioninate, allantoin-N-palmitoylmethioninate, allantoin N-stearoylmethioninate, allantoin N-benzoylmethioninate, and so forth.

The salts provided by this invention which may be prepared from the next higher homolog of methionine, containing an ethylthio group, include, for example, allantoin 2-amino-4(ethylthio)butyrate, allantoin N-acetyl-2-amino-4(ethylthio)butyrate, allantoin N-caproyl-2-amino-4(ethylthio)butyrate, allantoin N-palmitoyl-2-amino - 4(ethylthio)butyrate, allantoin N - benzoyl - 2 - amino-4(ethylthio)butyrate and the like. When the amino acid used for the preparation of the presently provided salts is one of the alkyl sulfonium α-aminobutyric acids mentioned above, the allantoin salts provided by this invention will include, for example the allantoin salt of dimethyl(3-carboxy-3-aminopropyl)sulfonium chloride, the allantoin salt of dimethyl(N-acetyl-3-carboxy-3-aminopropyl)sulfonium chloride, the allantoin salt of ethylmethyl(N-acetyl-3-carboxy-3-aminopropyl)sulfonium bromide, the allantoin salt of diethyl-(N-benzoyl-3-carboxy-3-aminopropyl)sulfonium chloride, the allantoin salt of ethylmethyl(N-caproyl-3-carboxy-3-aminopropyl)sulfonium chloride, and so forth.

When allantoin is reacted with cysteine, the salts which are formed may be designated as cysteinates. They include, for example, allantoin cysteinate, allantoin N-formylcysteinate, allantoin N-acetylcysteinate, allantoin N-caproylcysteinate, allantoin N-stearoylcysteinate, allantoin N-benzoylcysteinate, and so forth.

Cystine is a dibasic amino acid, and as will be appreciated by those skilled in the art, having two carboxylic acid groups, may form a salt wtih 2 moles of allantoin. Generally it will be the diallantoin salts which are provided by this invention, although the cystine may be reacted with such a proportion of allantoin as to produce the 1:1 addition salt. Illustrative of the cystine salts provided by this invention are, for example, allantoin cystinate, allantoin N,N'-diacetylcystinate, allantoin N,N'-dilauroylcystinate, allantoin N-acetyl-N'-benzoylcystinate, and so forth.

When the complex aluminum salts of allantoin are reacted with a sulfur-containing amino acid compound in accordance with this invention, it is believed that the salts which are formed are not addition, but substitution compounds. The complex aluminum salts of allantoin are considered to be salts in which the hydrogen attached to a ring of nitrogen atom has been replaced by aluminum. The residual valences of the aluminum atom are attached to other radicals, such as hydroxy radicals or the like. Thus, aluminum dihydroxy allantoinate is represented by the formula

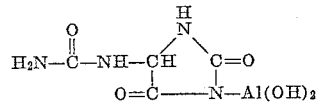

and aluminum chlorhydroxy allantoinate, by the formula

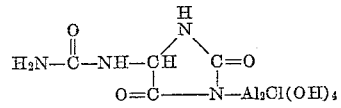

It is believed that when such a complex aluminum salt of allantoin is reacted with a carboxylic acid such as a sulfur-bearing amino acid compound, the carboxyl radical becomes attached to an aluminum atom as a replacement for one of the radicals satisfying the valences of the aluminum atom other than that satisfied by attachment to the allantoin molecule.

In any case, however, the novel products of this invention prepared from a complex aluminum salt of allantoin are salts of a sulfur-bearing amino acid compound with the complex aluminum salt of allantoin. They may be designated as aluminum allantoinate methioniates, cysteinates, cystinates, or the like. Thus, for example, the product of the reaction of aluminum hydroxy allantoinate with methionine may be designated as aluminum hydroxy allantoinate methioninate. Other salts provided by reaction of aluminum hydroxy allantoinate with a methionine compound comprise, for example, alumimum hydroxy allantoinate N-acetylmethioninate, aluminum hydroxy allantoinate N-butyrylmethioninate, aluminum hydroxy allantoinate N-benzoylmethioninate, aluminum hydroxy allantoinate N-stearoylmethioninate, and so forth. Similarly, this invention will provide aluminum hydroxy allantoinate 2-amino-4(ethylthio)butyrate, aluminum hydroxy allantoinate N-formyl-2-amino-4-(ethylthio)butyrate, aluminum hydroxy allantoinate N-acetyl-2-amino-4-(ethylthio)butyrate, aluminum hydroxy allantoinate N lauroyl-2-amino-4-(ethylthio)butyrate, aluminum hydroxy allantoinate N-toluyl-2-amino-4-(ethylthio)butyrate and the like; the aluminum hydroxy allantoinate of dimethyl(3-amino-3-carboxypropyl)sulfonium chloride, the aluminum hydroxy allantoinate salt of ethylmethyl(N - acetyl - 3-amino-3-carboxypropyl)sulfonium chloride, the aluminum hydroxy allantoinate salt of diethyl(N-acetyl-3-amino-3-carboxypropyl) sulfonium bromide, and so forth; aluminum hydroxy allantoinate cysteinate, aluminum hydroxy allantoinate N-acetylcysteinate, aluminum hydroxy allantoinate N-benzoylcysteinate, and so forth; aluminum hydroxy allantoinate, aluminum hydroxy allantoinate N,N'-diformylcystinate, aluminum hydroxy allantoinate N,N'-diacetylcystinate, and so forth.

Where the salts of this invention are prepared from aluminum chlorhydroxy allantoinate on the one hand and a sulfur-containing amino acid compound on the other, they will comprise, for example, methionine derivatives such as aluminum chlorhydroxy allantoinate methioninate, aluminum chlorhydroxy allantoinate N-acetylmethioninate, aluminum chlorhydroxy allantoinate N-stearoylmethioninate, aluminum chlorhydroxy, allantoinate N-propionylmethioninate, aluminum chlorhydroxy allantoinate N-benzoylmethioninate; and so forth. Other salts of this complex allantoin aluminum salt within the scope of this invention include, for example, aluminum chlorhydroxy allantoinate 2-amino-4-(ethylthio)butyrate, aluminum chlorhydroxy allantoinate N-acetyl-2-amino-4-(ethylthio)butyrate, aluminum chlorhydroxy allantoinate N-capryl-2-amino-4-(ethylthio)butyrate, and so forth; the aluminum chlorhydroxy allantoinate salt of dimethyl-(3-amino-3-carboxypropyl)sulfonium chloride, the aluminum chlorhydroxy allantoinate salt of dimethyl(N-acetyl-3-amino-3-carboxypropyl)sulfonium chloride, the aluminum chlorhydroxy allantoinate salt of ethylmethyl(N-acetyl-3-amino-3-carboxypropyl)sulfonium chloride, and so forth; aluminum chlorhydroxy allantoinate cysteinate, aluminum chlorhydroxy allantoinate N-acetylcysteinate, aluminum chlorhydroxy allantoinate N-caprylylcysteinate, aluminum chlorhydroxy allantoinate N-benzoylcysteinate, and so forth; and aluminum chlorhydroxy allantoinate cystinate, aluminum chlorhydroxy allantoinate N,N'-diacetylcystinate, aluminum chlorhydroxy allantoinate N,N'-diformylcystinate, aluminum chlorhydroxy allantoinate N,N'-ditoluylcystinate, and so forth.

Illustrative of other salts of the class provided by this invention containing aluminum are, for example, aluminum sulfam allantoinate N-acetylmethioninate, aluminum chlor allantoinate N-formyl-methioninate, aluminum chlor allantoinate cystinate, aluminum brom allantoinate cysteinate, aluminum acetate allantoinate N-propionylmethioninate, aluminum benzoate allantoinate N-acetylmethioninate, aluminum sulfate allantoinate N-acetylmethionate, the aluminum chlor allantoinate salt of dimethyl(N - formyl - 3-amino-3-carboxypropyl)sulfonium chloride, the aluminum benzoate allantoinate salt of ethylmethyl(N - acetyl - 3-amino-3-carboxypropyl)sulfonium chloride and so forth.

The preparation of the presently provided salts is effected by simply contacting the selected allantoin compound with the selected sulfur-containing amino acid compound in a mutual solvent. Generally, for the sake of economy, the allantoin compound and the amino acid compound will be mixed in ratios supplying approximate molar equivalents of each, but this is not critical, and the ratios may vary considerably. The solvent in which they are contacted will ordinarily be water, or at least a reaction medium containing water such as an aqueous alcoholic solution. The reaction medium need comprise only a sufficient amount of solvent to permit the salt formation to occur. Thus for example, one procedure which has been found to be particularly suitable in preparing the salts of this invention is to mix the allantoin compound and the sulfur-containing amino acid in a dry, finely-divided condition. Hot water such as boiling water is then added to the mixture with constant trituration. The entire reaction mixure solidifies and the solid product can then be broken up and dried to provide a powder comprising a salt as provided by this invention.

The reaction involved in the formation of the presently-provided salts generally requires exposure to somewhat elevated temperatures, at least momentarily, to be completed in a reasonable time. Moderately elevated temperatures, up to the boiling point of water, for example, are preferred. To avoid decomposition of allantoin or its salts, higher temperatures are desirably avoided. If desired, reaction temperatures down to room temperature or below may be employed. On completion of the reaction, when the product needs to be separated from a reaction medium in which it has been prepared, isolation of the product is preferably effected by means such as evaporation of the solvent under vacuum, or other methods known to those skilled in the art which similarly avoid exposure of the product to excessively high temperatures.

A comparison of properties of salts illustrative of those provided by this invention with those of the allantoin compound and amino acid compound from which they are prepared is presented in the following table:

|  | N-Acetyl methionine | Allantoin | Allantoin N-Acetyl-methioninate |
|---|---|---|---|
| Solubility in Water | Soluble | Slightly soluble in Cold, more soluble in Hot. | Soluble. |
| Solubility in 50% Alcohol. | ---do--- | Slightly soluble | Do. |
| Solubility in Alcohol. | ---do--- | ---do--- | Less soluble. |
| pH | 1.4 | 5.5 | 2.4. |
| Appearance | Powder | Powder | Powder. |

|  | N-Acetyl-methionine | Aluminum Dihydroxy-Allantoinate | Aluminum Hydroxy Allantoinate N-Acetylmethioninate |
|---|---|---|---|
| Solubility in Water | Soluble | Insoluble | Soluble. |
| Solubility in 50% Alcohol | ---do--- | ---do--- | Fairly soluble. |
| Solubility in Alcohol | ---do--- | ---do--- | Slightly soluble. |
| Appearance | Powder | Powder | Glassy. |
| pH | 1.4 | 7.0 | 4.0. |

The products of the present invention find many uses in the medical and cosmetic fields. The products may be made up in the form of semi-solid compositions such as lotions, creams, gels, or the like. Solid compositions, including talcum powders and the like, aerosol powders, and tablets which may be diluted with water or saline solution to make soothing and anti-inflammatory compresses or soaks can also be prepared. The present salts are very stable when introduced into aqueous or alcoholic solutions, and the stability can be maintained over prolonged periods of time by addition of small amounts, such as from 0.1% to 2%, of calcium, sodium or potassium acid phosphate salts or quaternary amines. In preparing medicinal or cosmetic compositions, the salts of the present invention may be formulated with conventional pharmaceutical or cosmetic carrier media. The salts may also be combined with other active pharmaceuticals and the like, such as aluminum acetate or magnesium sulfate, quaternary amines, hormones, vitamins, anti-perspirants, and so forth, to increase the effectiveness of both the new chemical compounds and the materials with which they are combined.

The products of the invention may be used in deodorant, anti-perspirant or hemostatic compositions and compositions for the treatment of various dermatological irritations, for internal remedies such as in the treatment of gastric-peptic ulcers, and in other applications where the healing and soothing properties of the products can be utilized.

The preparation of the products of the present invention will be more readily understood from a consideration of the following specific examples which are given for the purpose of illustration only and are not intended to limit the scope of the invention in any way.

Example I

Forty-eight grams of powdered N-acetyl-d,l-methionine are thoroughly mixed with 40 g. of powdered allantoin, and then 20 cc. of boiling distilled water is added all at once and the material is triturated until a solid mass forms. This is broken up and dried to provide allantoin N-acetyl-d,l-methioninate, yellowish-white powdered crystals, M. 205° C. (decomp.). Analysis indicates that the product contains approximately 41–44% allantoin and 50–53% N-acetyl-d,l-methionine.

This novel salt is soluble in water to the extent of 3 to 3½%, as compared with the much more limited solubility of allantoin. A 3% solution has a pH of 4.8.

This compound does not have the pronounced sulfur odor of the N-acetyl-d,l-methionine alone or simply mixed with allantoin.

Example II

The procedure of Example I is repeated using 38 g. of N-acetylmethionine and 40 g. of allantoin. The salt formed using this lower proportion of the amino acid compound is again the same as obtained in Example I.

Example III

This example describes a preparation of allantoin N-acetyl-methioninate in aqueous solution.

A solution is prepared by dissolving 38 g. of N-acetyl-d,l-methionine in 100 ml. of distilled water at 70° C. The mixture is stirred until the acetylmethionine is dissolved, and then the temperature of the solution is raised to 100° C. Sixteen grams of allantoin are now slowly added while the solution is constantly stirred. The reaction mixture is then boiled for about 2 hours.

The resulting solution has a pH of 2.4. Evaporation of the solution, preferably under a vacuum, produces aluminum N-acetylmethioninate, mol. wt. 331, as a fine crystalline powder which is quite different from the fluffy powder of the methionine compound.

Example IV

This example describes another preparation of allantoin N-acetyl-d,l-methioninate in aqueous solution.

In this preparation, 38 g. of N-acetyl-d,l-methionine are dissolved in 300 cc. of hot distilled water which is then brought to the boiling temperature. Allantoin, 32 g., is added and the reaction mixture is boiled till solution is complete. It is then evaporated at 160° F. under vacuum to dryness to produce allantoin N-acetyl-d,l-methioninate having the properties stated in Example I.

Example V

The procedure of Example IV is repeated using 30 g. of N-acetyl-d,l-methionine and 32 g. of allantoin. The product again has an analysis indicating the formation of a 1:1 equimolar addition compound.

Using the trituration procedures of Examples I and II or the aqueous solution procedures of Examples III–V, but substituting N-formyl-2-amino-4-(ethylthio)butyric acid for the methionine compound, the salt produced is allantoin N-formyl-2-amino-4-(ethylthio)butyrate.

Proceeding similarly, but using diethyl(N-acetyl-3-carboxy-3-amino propyl)sulfonium chloride or ethylmethyl-(N-acetyl-3-carboxy-3-aminopropyl)sulfonium chloride as the sulfur-bearing amino acid compound, the salts produced are the allantoin salts of the stated sulfonium compounds. By substituting N-benzoylcysteine or N,N'-dibenzoylcystine for the N-acetylmethionine, there are produced allantoin N-benzoylcysteinate and allantoin N,N'-dibenzoylcystinate.

Example VI

This example describes the preparation of an aluminum salt as provided by this invention.

Thirteen grams of powdered aluminum dihydroxy allantoinate are thoroughly mixed with 10 g. of N-acetyl-d,l-methionine. Five cc. of boiling distilled water are added all at once to this mixture and the material is triturated until a solid mass is formed. It is then dried at 120° F. to provide aluminum hydroxy allantoinate N-acetyl-d,l-methioninate.

This material is glassy-appearing in the mass. On reduction to a powder, it has white to yellowish-white color. A 4% suspension of the powder has a pH of 5.8. Analysis indicates that this salt contains approximately 43% N-acetyl-d,l-methionine and 57% aluminum dihydroxy allantoinate (31% as allantoin).

Example VII

The procedure of Example VI is repeated using 13 g. of aluminum dihydroxy allantoinate and 8 g. of N-acetyl-d,l-methionine. The product is again aluminum hydroxy allantoinate N-acetyl-d,l-methioninate.

Example VIII

This example describes a preparation of an aluminum hydroxy allantoinate salt as provided by this invention in aqueous solution.

A solution is prepared by adding 9.5 g. of N-acetyl-d,l-methionine to 200 ml. of hot water and stirring until the compound is dissolved. Then 10.9 g. of aluminum dihydroxy allantoinate are gradually added, while heating is continued. The solution is maintained at a constant temperature of 70° C. with continuous stirring until solution is complete. The solution is initially formed with a pH of 1.5. It will become stabilized at a pH of 4.

To isolate the aluminum salt, the solution is filtered to remove particles making it turbid, and then cooled and evaporated under vacuum. The salt is obtained as a granular product which can be pulverized.

Example IX

This example illustrates the preparation of a different aluminum salt in accordance with this invention.

Five cc. of boiling water are added all at once to a thorough mixture of 32 g. of aluminum chlorhydroxy allantoinate with 20 g. of N-acetyl-d,l-methionine. The mixture is triturated to a solid mass which is dried at 140–160° F. The product is aluminum chlorhydroxy allantoinate N-acetyl-d,l-methioninate. It contains approximately 58% aluminum chlorhydroxy allantoinate and 36% N-acetyl-d,l-methionine. It is a white to yellowish-white powder, soluble to the extent of 4–5% in water. A 4% solution has a pH of 4.2.

Example X

The procedure of Example IX is repeated but using 32 g. of aluminum chlorhydroxy allantoinate and 30 g. of the methionine compound. The product is again aluminum chlorhydroxy allantoinate N-acetyl-d,l-methioninate.

Example XI

This example describes the preparation of an aluminum chlorhydroxy allantoinate salt in aqueous solution.

A solution is prepared by adding 9.5 g. of N-acetyl-d,l-methionine to 200 ml. of water at 70° C. and stirring until solution is complete. Then 11.83 g. of aluminum chlorhydroxy allantoinate are slowly added with continuous stirring while the temperature is maintained at 70° C. After the addition is complete, the temperature is maintained at 70° C. and stirring is continued for about 1 hour. The resulting solution is cooled and then evaporated under vacuum to provide aluminum chlorhydroxy allantoinate N-acetyl-d,l-methioninate as a granular material which can be reduced to a fine hygroscopic powder having a solubility at least 15 times the solubility of allantoin itself.

By reaction of aluminum dihydroxy allanoinate with N-acetyl-2-amino-4(ethylthio)butyric acid, using procedures as described above, there is produced aluminum hydroxy allantoinate N-acetyl-2-amino-4-(ethylthio)butyrate.

Reaction of aluminum chlorhydroxy allantoinate with ethylmethyl - (N-acetyl-3-carboxy-3-amino-propyl)sulfonium chloride in similar fashion produces the corresponding salt of the aluminum allantoinate with the sulfonium compound.

*Example XII*

The allantoin N-acetylmethioninate of Examples I–V is formulated into a lubricating cream according to the following formula:

| | Percent by weight |
|---|---|
| Paraffin, white, 135° F | 3.0 |
| Micro crystalline wax, 170° | 2.0 |
| White beeswax | 5.0 |
| Spermaceti | 4.0 |
| Anhydrous lanolin | 2.0 |
| Sesame oil | 30.0 |
| Light mineral oil | 29.8 |
| Oleic acid, white | 1.0 |
| Water | 19.9 |
| Allantoin methioninate | 0.2 |
| Butyl para-hydroxy benzoate | 0.2 |
| Triethanolamine | 1.5 |
| Perfume | 0.4 |

The waxes and oils are melted together, the butyl parahydroxy benzoate added, and the mixture brought to 75° C. The allantoin methioninate is dissolved in the water and heated to 75° C., after which the triethanolamine is added to the aqueous solution. Then the water solution is run into the molten fats with vigorous stirring. The mixture is cooled, and then the perfume is added.

*Example XIII*

The aluminum chlorhydroxy allantoinate N-acetylmethioninate of Examples IX–XI is formulated into an astringent antiseptic body lotion as follows:

| | Percent by weight |
|---|---|
| Alcohol, specially denatured, 59° C | 50.0 |
| Perfume (Lavender Bouquet) | 0.2 |
| Propylene glycol | 3.0 |
| Aluminum chlorhydroxy allantoinate N-acetylmethioninate | 0.2 |
| Water | 46.8 |

The N-acetylmethioninate compound is dissolved in the water. The perfume is mixed with the propylene glycol and dissolved in the alcohol. The alcohol solution is then added to the water solution slowly, with constant stirring. The resulting mixture is then chilled, held at 8° C. overnight, and finally treated with a silica gel to clarify it and filtered.

While the invention has been described with particular reference to specific individual embodiments thereof, it is to be appreciated that, modifications and variations may be made within the scope of the invention and the appended claims.

What is claimed is:

1. The salts of allantoin with acid compounds selected from the group consisting of the physiologically useful sulfur-containing alpha-amino acids and the physiologically useful sulfur-containing alpha-acylamino acids in which acyl is hydrocarbon

and said hydrocarbon contains up to 17 carbon atoms and is selected from the group consisting of alkyl and aromatic hydrocarbon.

2. The salts of allantoin with the physiologically useful sulfur-containing alpha-acylamino acids in which acyl is hydrocarbon

and said hydrocarbon is lower alkyl.

3. Allantoin N-lower alkanoyl methionates.
4. Allantoin N-acetyl-d,l-methioninate.
5. Allantoin cysteinate.
6. Allantoin N-acetyl cysteinate.
7. Allantoin cystinate.
8. Allantoin N,N'-diacetyl cystinate.

References Cited in the file of this patent

UNITED STATES PATENTS

| 2,158,098 | Zellner et al. | May 16, 1939 |
| 2,334,348 | Nuglaiese | Nov. 16, 1943 |
| 2,761,867 | Mecca | Sept. 4, 1956 |
| 3,007,846 | Gever et al. | Nov. 7, 1961 |

OTHER REFERENCES

Langfeldt et al., Chem. Abstracts, volume 20, page 431 (1926).

Albanese, Chem. Abstracts, volume 39, column 722 (1945).